US009438678B2

(12) United States Patent
DeSalvo et al.

(10) Patent No.: US 9,438,678 B2
(45) Date of Patent: Sep. 6, 2016

(54) METHODS AND SYSTEMS FOR APPLIANCE COMMUNITY SERVICE MANAGEMENT (75) Inventors: Thomas E. DeSalvo, Saint Charles, IL (US); Michael Kozlowski, Roswell, GA (US); Samuel Monnie, Kenosha, WI (US); Jeffrey Vance Klimek, Crystal Lake, IL (US); Christopher Michael Munoz, Chicago, IL (US); Martin Edward Olson, III, Elmhurst, IL (US); Timothy Ray Adkisson, Chicago, IL (US); Eva Christiansen, Huntley, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 0 days.

(21) Appl. No.: 13/421,423

(22) Filed: Mar. 15, 2012
(Under 37 CFR 1.47)

(65) Prior Publication Data
US 2013/0073690 A1 Mar. 21, 2013

Related U.S. Application Data (60) Provisional application No. 61/453,775, filed on Mar. 17, 2011, provisional application No. 61/453,733, filed on Mar. 17, 2011.

(51) Int. Cl.
*G06F 15/16* (2006.01)
*H04L 29/08* (2006.01)

(52) U.S. Cl.
CPC .............. *H04L 67/125* (2013.01); *H04L 67/12* (2013.01)

(58) Field of Classification Search
CPC .............................. H04L 67/12; H04L 67/125

USPC .................................................. 709/208, 219
See application file for complete search history.

(56) References Cited

U.S. PATENT DOCUMENTS

| 4,323,773 A | 4/1982 | Carpenter |
| 4,503,502 A | 3/1985 | Chapin |
| 6,137,095 A | 10/2000 | Kashimoto |
| 6,486,453 B1 | 11/2002 | Bales |
| 6,549,818 B1 | 4/2003 | Ali |
| 6,936,802 B2 | 8/2005 | Ishikawa |
| 6,953,342 B2 | 10/2005 | Bisogno |
| 7,196,625 B1 | 3/2007 | Nguyen |

(Continued)

OTHER PUBLICATIONS

Canadian Patent Office, Office action in Canadian Patent Application No. 2,771,471, dated Jan. 24, 2014. (4 pages).

(Continued)

*Primary Examiner* — Hee Soo Kim
(74) *Attorney, Agent, or Firm* — McAndrews, Held & Malloy, Ltd.

(57) ABSTRACT

A method and system for networking a plurality of appliances. The method and system include providing an appliance on a network, controlling operation of the appliance with a microcontroller, storing on a memory coupled with the microcontroller, computer executable instructions for operating the appliance, sensing the operation of the appliance, displaying information regarding the operation of the appliance, and communicating the operational data on a network. Network connectivity includes communication directly with a network, and with another appliance. A host system is connected to the network and adapted to receive the usage data and to transmit data to the appliance to influence operation of the appliance.

36 Claims, 4 Drawing Sheets

(56) References Cited

U.S. PATENT DOCUMENTS

| | | | |
|---|---|---|---|
| 7,249,708 B2 | 7/2007 | McConnell | |
| 7,301,456 B2* | 11/2007 | Han | G08B 13/1966 340/539.25 |
| 8,051,381 B2 | 11/2011 | Ebrom | |
| 8,276,505 B2 | 10/2012 | Buehler | |
| 2001/0010032 A1* | 7/2001 | Ehlers | G05B 15/02 702/62 |
| 2002/0097851 A1* | 7/2002 | Daum | H04L 29/06 379/102.03 |
| 2002/0120534 A1 | 8/2002 | Howard | |
| 2003/0080113 A1 | 5/2003 | Williamson | |
| 2003/0083770 A1* | 5/2003 | Williamson | 700/117 |
| 2003/0139975 A1 | 7/2003 | Perkowski | |
| 2004/0083471 A1* | 4/2004 | Nam | G06F 8/65 717/168 |
| 2005/0131761 A1 | 6/2005 | Trika | |
| 2005/0160005 A1 | 7/2005 | Roth | |
| 2005/0273345 A1 | 12/2005 | Castillejo | |
| 2006/0190363 A1 | 8/2006 | Brown | |
| 2007/0094090 A1 | 4/2007 | Jenkins | |
| 2007/0129812 A1* | 6/2007 | Ferchau | G05B 19/0428 700/1 |
| 2007/0141540 A1 | 6/2007 | Borg | |
| 2007/0143126 A1 | 6/2007 | Ghose | |
| 2008/0064395 A1* | 3/2008 | Sibileau | G08C 17/02 455/433 |
| 2008/0108388 A1* | 5/2008 | Ebrom | D06F 39/005 455/557 |
| 2009/0030829 A1 | 1/2009 | Chatter | |
| 2009/0040067 A1* | 2/2009 | McCoy | G06F 9/54 340/6.11 |
| 2009/0087819 A1 | 4/2009 | Adachi | |
| 2009/0292591 A1 | 11/2009 | Schultz | |
| 2009/0299849 A1 | 12/2009 | Cao | |
| 2010/0085144 A1* | 4/2010 | Aisa | G05B 19/0423 340/3.1 |
| 2010/0094475 A1* | 4/2010 | Masters | G06F 1/26 700/292 |
| 2010/0121807 A1 | 5/2010 | Perrier | |
| 2010/0182136 A1 | 7/2010 | Pryor | |
| 2010/0231506 A1 | 9/2010 | Pryor | |
| 2010/0299600 A1 | 11/2010 | Archer | |
| 2010/0313768 A1 | 12/2010 | Koether | |
| 2011/0074589 A1* | 3/2011 | Han et al. | 340/618 |
| 2011/0167100 A1 | 7/2011 | Brodowski | |
| 2012/0171646 A1 | 7/2012 | Chen | |
| 2012/0179665 A1 | 7/2012 | Baarman | |
| 2012/0260683 A1 | 10/2012 | Cheon | |
| 2013/0052616 A1 | 2/2013 | Silverstein | |
| 2013/0117106 A1 | 5/2013 | Glassman | |

OTHER PUBLICATIONS

Canadian Patent Office, Office action in Canadian Patent Application No. 2,771,745, dated Jan. 28, 2014. (5 pages).
Canadian Patent Office, Office action in Canadian Patent Application No. 2,771,743, dated Jan. 31, 2014. (5 pages).
Canadian Patent Office, Office action in Canadian Patent Application No. 2,771,471, dated Aug. 26, 2014. (3 pages).
Canadian Patent Office, Office action in Canadian Patent Application No. 2,771,741, dated Nov. 27, 2015 (6 pages).
Canadian Patent Office, Office action in Canadian Patent Application No. 2,771,743, dated Jul. 29, 2015 (6 pages).

* cited by examiner

METHODS AND SYSTEMS FOR APPLIANCE COMMUNITY SERVICE MANAGEMENT

CROSS REFERENCE TO RELATED APPLICATIONS

This application is a non-provisional application claiming priority from U.S. Provisional Application Ser. No. 61/453,775, filed Mar. 17, 2011, entitled "Laundry Service Manager for Mobile Devices, Internet, Home Hub Portal, PC, TV, and Appliance display screen," and U.S. Provisional Application Ser. No. 61/453,733, filed Mar. 17, 2011, entitled "Auto Detergent Dispenser (and Adviser App) for Laundry."

This application is related to U.S. patent application Ser. No. 13/421,603, entitled "Methods and Systems For Coupon Service Applications," filed Mar. 15, 2012, and U.S. patent application Ser. No. 13/421,499, entitled "Methods and Systems for Device Management with Sharing and Programming Capabilities," filed Mar. 15, 2012.

All of the above-cited applications are incorporated herein by reference in their entirety.

FIELD OF THE DISCLOSURE

The present disclosure generally relates to managing the an appliance and/or a community of appliances, and more particularly, to methods and systems for appliance community service management.

BACKGROUND

Current smart appliance initiatives are driving appliance and equipment manufacturers to provide appliance connectivity that can respond to and appliance performance. Smart appliances provide consumer awareness of the current appliance cycle and allow for configuration thereof.

For example, U.S. Pat. No. 8,051,381, hereby incorporated by reference in its entirety describes an appliance configured to perform a physical cycle of operation on an article including a controller to control the cycle of operation and an interface in network configuration with the controller to connect an accessory configurable to affect the cycle of operations. A graphical user interface in network communication with the controller and the interface is provided so that an accessory connected to the interface is configurable using the graphical user interface to affect the cycle of operation of the appliance.

While the appliance of U.S. Pat. No. 8,051,81 includes a programmable controller, the additional operation cycles, changes to existing cycles, or other relevant information must be uploaded to the operation cycle component through purchase at a retail store, or uploading to the operation cycle component at the retail store. Alternatively, the user can download additional operation cycles, changes, or relevant data via the Internet, such as through a personal computer and then upload the additional operation cycles to the operation cycle component. Additionally, while the user can wirelessly directly download the operation cycles to the operation cycle component, the appliance is not part of an appliance network as currently disclosed.

Therefore, while the appliance of the previous reference may function for its intended purposes, there is an identifiable need for an improved networked community of appliance that allow for the implementation of a laundry service manager and/or the optimization of an appliance based upon the supplies utilized by the appliance.

DETAILED DESCRIPTION

The following description of example methods and apparatus is not intended to limit the scope of the description to the precise form or forms detailed herein. Instead, the following description is intended to be illustrative so that others may follow its teachings.

Example methods and systems for providing a community for a plurality of appliances are disclosed herein. In general, the disclosed examples allow for the implementation of a laundry service manager that is configured within the home environment. In one example, the community includes a plurality of communication enabled appliances including a washer, dryer, water heater, dishwasher, oven, refrigerator, lighting, computer, and/or other suitable home appliance, a home hub (e.g., a modem, router, etc.) a network connection, and alternatively a mobile device.

In the described example, each individual appliance has the communication ability to talk to a home router or hub. The hub, in turn, communicates through a network such as, for example, the Internet to a server maintained by a supplier such as a manufacturer and/or retailer to process information requests either directed to the appliance or from data repositories that contain information such as information regarding the appliance.

In the presently described examples, the disclosed system provides the ability to monitor the various functions of the appliance. In particular, the system may monitor the functional use of the appliance, such as the status of the appliance (e.g. the current cycle, filling, washing, rinsing, spinning, drying, cooling, etc), the time left in operation, the status of the appliance delay if applicable, the cycle attributes such as the operational parameters, stored personalized attributes, and/or appliance health as desired.

Additionally, the disclosed system may allow the remote control of the appliance through the described network community. Specifically, the remote control may influence the parameters of the cycles, including, in the instance of a washing machine, the water temperature, soil level, spin speed, etc. Still further, the remote control may be utilized to monitor and/or control the appliance such as to pause, extend, alter, and/or terminate processing.

In still other instances, the present community system can provide the appliance and/or customer with product information relevant to the appliance and/or use thereof. For instance, the connected system may allow the supplier to provide product information such as use and care guides, standard warranty information, recall information, product updates (e.g., firmware, hardware, software, etc.) long term care recommendations, troubleshooting and diagnostic code recognition and/or servicing, parts lists, etc.

Still further, the described system may provide the supplier with the ability to accept, mine, and/or process long term data regarding the use of the appliance. For instance, the system may collect long term data such as water and energy consumption per cycle, extended water and energy consumption per week/month/year/lifetime, etc., the statistical use of various cycles, the number of cycles run on a periodic basis, and/or the statistical time of usage of the appliance.

In yet another example, the present community of appliances includes at least one application, (e.g., a dedicated app, mobile app, etc) that includes the content of the owner's manual for the specific appliance and provides immediate access to product specific information and visibility. The application provides trouble-shooting and contact information so that a consumer doesn't have to look through and find the use and care printed manuals but has the information at their fingertips on the appliance and/or handheld (e.g mobile device, home hub, etc.).

Because the present system provides connectivity for multiple appliances, the present system can provide up to date recall information, if applicable, can provide product alerts, or can provide any new product information including new software and/or technology upgrades. The present system provides a customer with duress maintenance notifications and informs the customer when a part is wearing down or needs to be changed. This allows the customer to be proactive with calling customer service early enough rather than having the machine break down and not be able to utilize the appliance. Any received alerts will persist on the appliance around the home until the consumer takes a specific action to respond to the alert. It will be appreciated that most individuals utilize appliance to make their lives more convenient and as such the present system allows a user to perform different task (e.g. provides for multi-tasking) to maximize their time. The described system provides for the detection and/or prediction of problems in operation of the appliance and may warn and/or terminate processing before the appliance has a mechanical and/or electrical breakdown. Additionally, the present application may provide the customer with scheduled maintenance reminders and/or alerts such as cleaning of parts of the appliance, etc.

Because the present system provides for a network community of appliances, the application can provide real time alerts of the appliance status to the supplier system, the costumer on various connected devices (e.g., mobile alerts, home hub etc.), and/or other networked appliances/devices. The example application may alert the consumer and/or other devices to the present operating status of the running appliance, allowing the consumer to control and/or modify operation remotely.

Each of the presently disclosed appliances on the community network provide for a means of determining the content and/or type of consumable associated with the appliance. In particular, the appliance may be provided with a barcode scanner, radio-frequency identification (RFID) detector, sensor, programmable user interface, etc. to provide consumable content to the appliance. Specifically, in the example of the appliance being a laundry device, the device may include a scanner to determine the formula of the consumable (e.g., the detergent) in real-time from a networked service, and adjust the cycle operation of the appliance in real-time. In another example, a chemical sensor may be provided to detect the actual formulation of the consumable, the water, etc. without input of the consumer. In any instance, the program of the appliance may be adapted as necessary to optimize the usage of the appliance.

For instance, an appliance, such as a washing machine may be optimized to utilize a certain type of consumable, for example a high-efficiency (HE) detergent. If the appliance determines that the wrong type of consumable, or an alerted version of the consumable if being utilized, the appliance may automatically adjust the cycle of operation to ensure that the operation cycle compensates for the incorrect usage. As will be appreciated, as previously described, the application can provide the consumer with alerts specifically tailored to inform the consumer of the incorrect usage of the consumable, provide recommendations for correct usage, and/or provide marketing incentives (e.g., coupons, etc.).

An appliance with the present system feature will detect the type, concentration, brand, and/or manufacturer of the additive used in the appliance, such as a washing machine, the level of hardness of the water, and the temperature of the inlet water to optimize the performance of the washer to achieve the best cleaning and efficiency performance. The machine will sense each type, concentration, and/or manufacturer/brand of additive put into the machine and send this information to a supplier database in the cloud to determine the maker, type, quantity of, and/or overlapping usage of the additives used. Then the appliance will be notified how to adjust the type of mechanical action, thermal or time settings or other options and modifiers available on the machine based on the hardness or water and temperature of inlet water in order to produce the best cleaning result, most accurate use of additives or most efficient operation without compromising the cleaning performance.

The washing machine will also monitor the level of additives within the machine, or based upon usage and reservoir capacity, to report to the consumer the amount of additives available for application. Additionally, the washer will present a message through the user interface either a 'low level' alert, 'add more' alert, or indicate that the reservoir is empty and requires replenishment.

Finally, because the networked system allows for the tracking and monitoring of usage statistics, consumable usage, energy usage, cycle usage, etc., the system may provide for a savings tabulator application. In one example, the savings tabulator may provide for an estimated period savings, a current savings tabulation, and/or a future predicted savings tabulation.

The example systems disclosed herein allow for the interoperability of different manufacturers of smart household appliances, either through built-in devices, or externally connected devices, to monitor the community of appliances usage. In one example an external and/or internal sensor measures the consumable status/usage of the connected appliance and stores data regarding the usage. In another example, an external and/or internal controller may provide for the control and/or modification of an appliance operation cycle.

In one example, the system provides the use of commodity hardware, off the shelf software, OS independent applications, form factor independent devices (PC, tablets, smart phones, etc), media independent (voice, text, video) and a cloud based infrastructure to run all functionalities of the appliance connectivity. This is in contrast to the specialized hardware, proprietary software and/or dedicated, non-interconnected processors that typically run current appliances. In the context of a consumer environment, such as for example, a residence, the disclosed methods and systems are particularly useful for providing enhanced services as will be described in detail herein.

Figure 1:
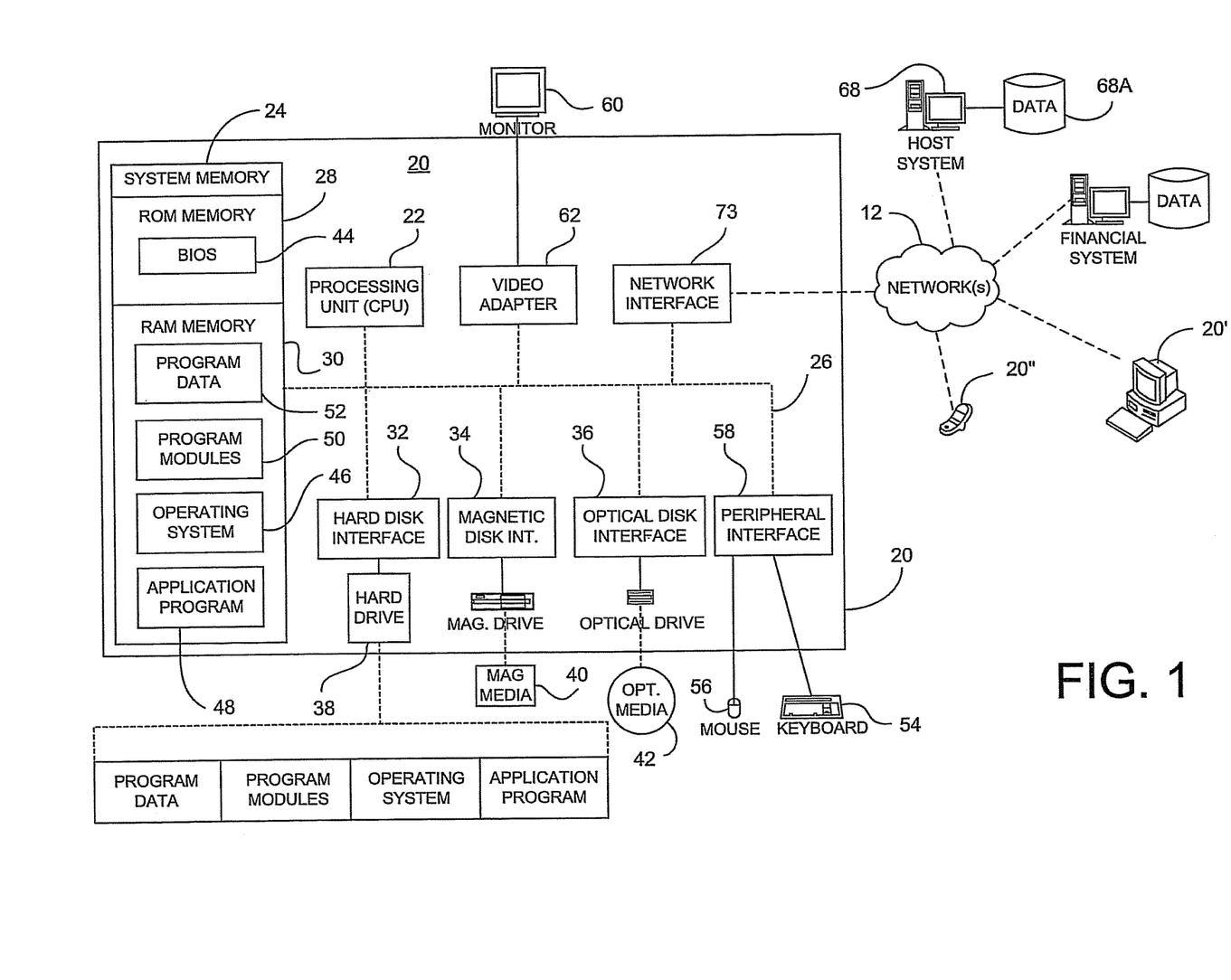
FIG. 1 is illustrates in block diagram form components of an example, computer network environment suitable for implementing the example appliance community system disclosed.

With reference to the figures, the following discloses various example systems and methods for providing community appliance management, and more particularly to laundry appliance management. To this end, FIG. 1 illustrates a processing device 20", illustrated in the exemplary form of a mobile communication device, a processing device 20', illustrated in the exemplary form of a computer system, and a processing device 20 illustrated in schematic form, such as for example, a laundry appliance, are provided with executable instructions to, for example, provide a means for a customer, e.g., a user, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a laundry appliance, a personal computer, mainframe computer, personal-digital assistant ("PDA"), cellular telephone, tablet, ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this example, the server 68 may act as a scheduler as described herein. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, receiving information regarding at least one appliance's energy usage, receiving information regarding the operation of the smart grid, and providing a scheduling service to coordinate the use of the appliance.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 3:
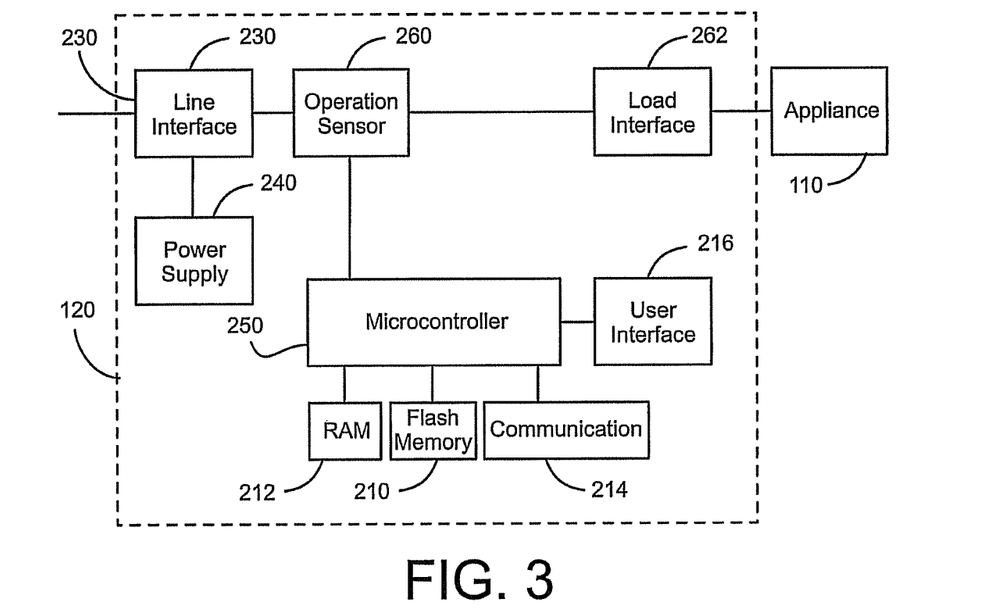
FIG. 3 is a component diagram of a example sensor unit for use with an appliance in the example appliance community system.

FIG. 3 illustrates an example community energy management system 100 in accordance with one example of the present disclosure. In this example, the system 100 comprises at least one electronic device, such as a home appliance 110 in communication with one or more sensor unit 120. The example sensor unit 120 may be a usage monitoring device, a controller, a chemical sensor, etc., and may be externally connected and/or internally connected (i.e. built-in) to the at least one appliance 110, or otherwise suitably electrically coupled to the appliance 110. In the illustrated example, one sensor unit 120 is shown as an internal device that is integrally contained within the appliance 110.

As noted above, the appliance 110 may be any electronic device, such as for example, a washing machine, a dryer, a refrigerator, a television, a coffee maker, etc. It will be understood that there are many other appliances and/or pieces of equipment that may be used with the present system 100 without departing from the spirit of the present disclosure. Furthermore, it will be appreciated that in the system 100, each appliance may be adapted to communicate with other appliances 110, communicate with a home hub 140 as will be described and/or communicate directly with the network 12 as desired.

At least one example sensor unit 120 is configured to measure various operating parameters and/or various consumable statutes of the connected appliance(s) 110 or other piece(s) of equipment. Still further, at least one example sensor unit 120 is configured to store the inventory, cycle operations and/or usage data of the connect appliance(s) in its own memory. For instance, as illustrated in FIG. 3, an example sensor unit 120 includes a flash memory 210 and/or a random access memory (RAM) 212 to store the collected data. The unit 120 may use other types of memory in addition to, or in lieu of, flash memory 210 and RAM 212 to store the data. The data is, in turn, transmitted to the home hub 140 (see FIG. 2) such as, for example, a personal computer (PC), terminal, router, smartphone, tablet, or other suitable device via a communicator 214, such as a wireless connection using the local area network with WiFi, ZigBee®, Bluetooth, infrared, or the like. While the connection between the unit 120 and the home hub 140 is illustrated as being a communicator 214, a person of ordinary skill in the art will recognize that the data connection may be any suitable connection including a wired and/or wireless connection as desired. Software, firmware, and/or hardware executing and/or contained within the home hub 140 processes the use data generated by the connected appliance 110 and is adapted to at least one of display the data on an integrated and/or external display having a user interface 216, and/or transmit the data to the host system server 68, or other suitable service, such as a cloud service through the network 12, including an Internet, cellular, wireless, wired, LAN, tethered, and/or any other suitable connection.

In the illustrated example, the transmitted data may be segregated into different services and/or servers within the data repository 68A as shown in FIG. 3, including a community server 170, an analytics server 172, a web server 174, or a service server 176. While the data may be segregated in the illustrated example, the data need not be divided or alternatively may be divided even further as desired. The example unit 120 facilitates the ability for an operator of the server 68 to offer consumers a laundry service manager, provide product updates and/or customer support, provide consumable monitoring and/or recommendations, provide real-time alerts, provide cycle monitoring and/or editing, and/or provide operating saving recommendations and usage optimization options.

Figure 2:
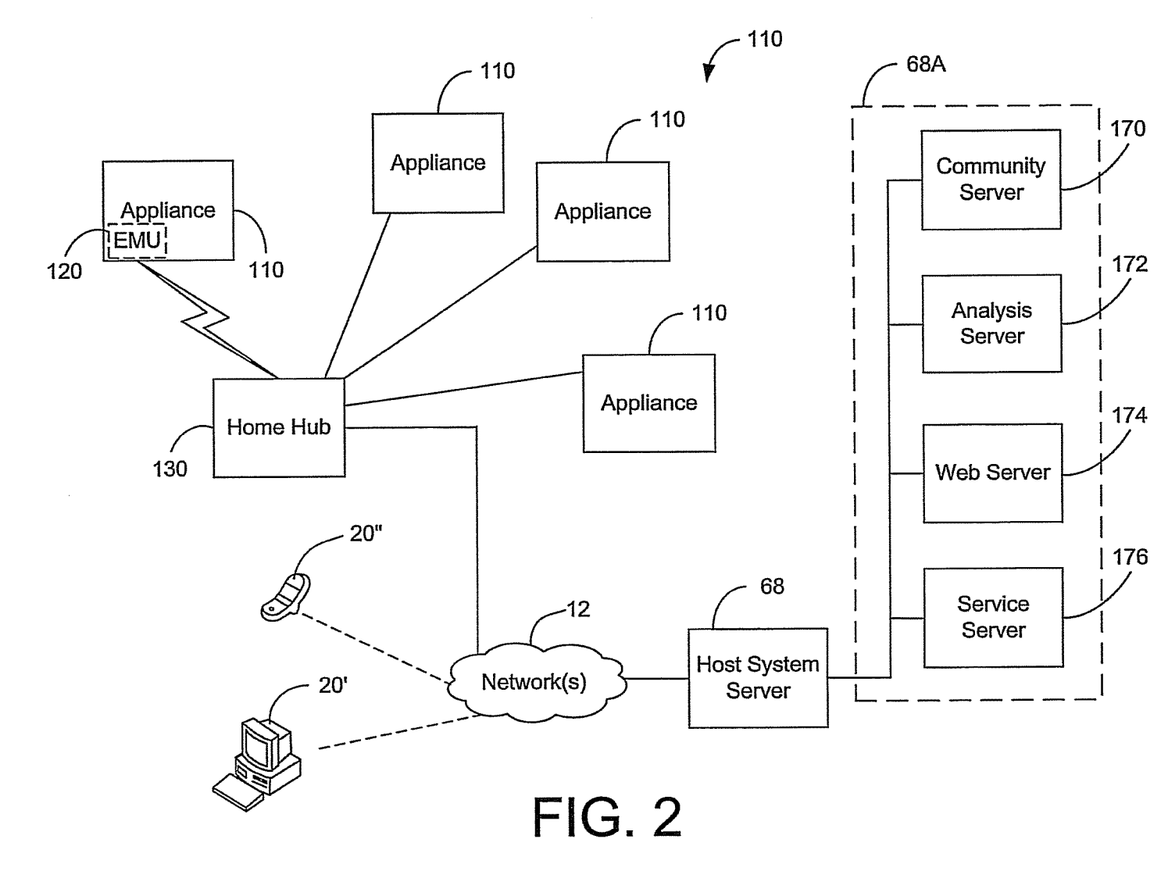
FIG. 2 is a system diagram of an example appliance community system.

As illustrated in FIG. 2, the example appliance management community 100 is illustrated showing a home hub 130 communicating with the unit 120 and/or the appliance 110 directly. In the example community 100, the operating cycle, consumable level, alerts, etc. for each appliance 110 communicating with the home hub 130 is collected and forwarded through the network 12 to the server 68. For instance, the server 68 may collect any relevant data including, for example, appliance information for each registered appliance 110, operating data, cycle usage, consumable data, and/or any other suitable data. It will be appreciated that this information may be provided in any suitable manner, including for example, by manually entering the data, registering the appliance, automatically detecting the information, by a third-party, by the manufacturer, and/or any other suitable method, by embedded sensors, by scanning such as bar-code, RFIDs, mobile data inputting, and/or any other suitable input method.

One example unit 120 for use in the community 100 is shown in FIG. 3. The example unit 120 comprises a line interface 230 which is inductively coupled to the power line to rectify and provide line powered DC voltage 240 to a microcontroller 250, the memories 212, 210, the communicator 214, and the user interface 216. An operation sensor 260, such as for a laundry machine example, a moisture monitor relays operating cycle status and/or control instructions to the coupled appliance 110 through a load interface circuit 262. For instance, the moisture monitor may actively determine the moisture content of the laundry machine and actively control the operating cycle of the appliance accordingly. In this example, the example operating sensor 260 and the example load interface 262 work in conjunction with a consumable sensor (e.g., a chemical probe, bar-code scanner, inventory control system, manual input system, etc) to ensure that the appliance is operating in optimized fashion.

As previously described, the communicator 214 may periodically transmits use data to the home hub 140 via a wireless and/or wired connection using the local area network with WiFi, ZigBee®, or the like. For example, the user interface 216 communicates the status of the unit 120 and provide at least one user interface element which allows the user to interact with the appliance 110. For instance, the user interface 216 may provide a display on which use data and the like are shown to the user.

Figure 4:
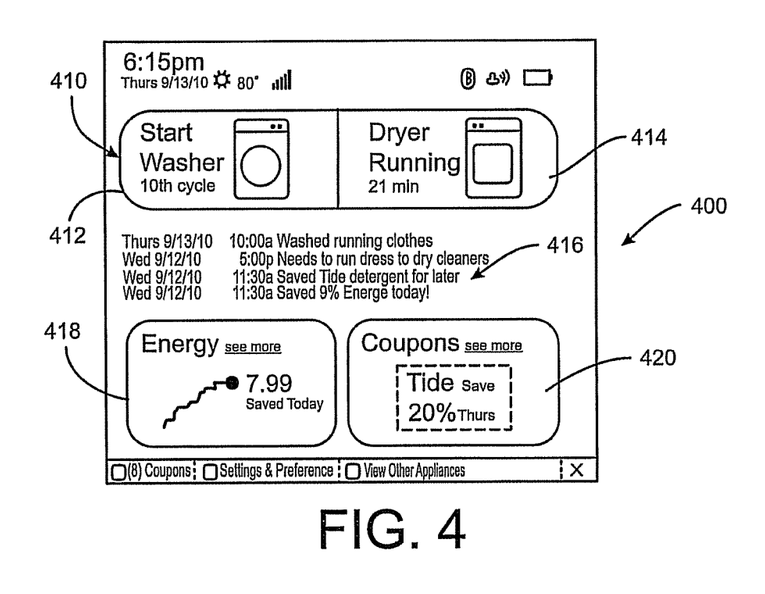
FIG. 4 is an illustration of an example user interface for use in the example appliance community system.

An example user interface 400 for providing information regarded the networked appliance 110 on the user interface 216 is illustrated in FIG. 4. In this example, the interface 400 includes a "dashboard" type view of the user's appliance network. For example, the interface 400 may provide a control portion 410 that includes information regarding the current status of the networked appliances 110. In this example, the control portion 410 includes a selectable area 412 to start the operation cycle of a washer. Additionally, the control portion 410 includes a selectable area 414 to view the operating cycle status of a dryer. In each instance, however, the areas 412, 414 may also allow the user to control and/or otherwise change the operating status of the identified appliance such as to allow the user to select operating cycles remotely and/or at the appliance 110, modify the operating parameters, delay start/stop and/or pause operation, obtain fault information, modify and/or monitor consumable, such as detergent, etc.

Additionally, the example user interface 400 provides one or more alert messages 416 which may be generated from the appliance 110 itself, or from the server 68. For example, in the illustrated example, the alerts include a reminder regarding the completed cycle, a reminder regarding the need to run an additional cycle, a reminder regarding the monitored consumable (e.g. detergent level) and a reminder regarding a coupon delivered by the server 68.

Still further, the example interface 400 includes a saving portion 418 that, in this instance, displays a total estimated savings amount over a predetermined time period, such as a single day. Finally, the interface 400 may provide an additional incentive interface 420 such as a coupon incentive provider area to provide relevant coupons to the consumer. It will be appreciated by one of ordinary skill in the art that the interface 400 may provide other information as desired.

Figure 5A:
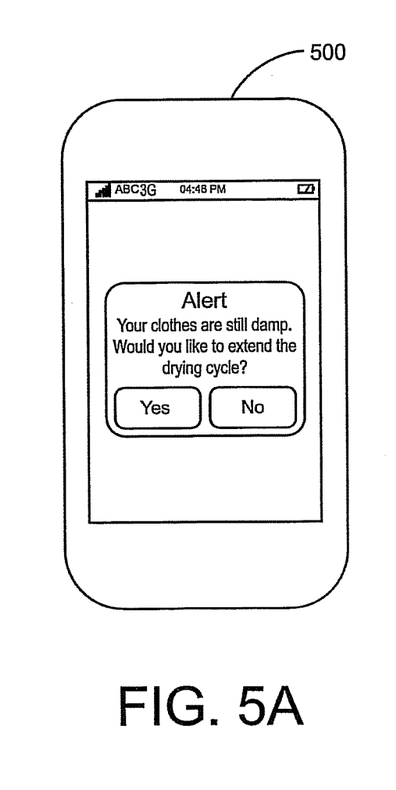
FIGS. 5A-5C together illustrate and example alert user interface for use in the example appliance community system.
Figure 5B:
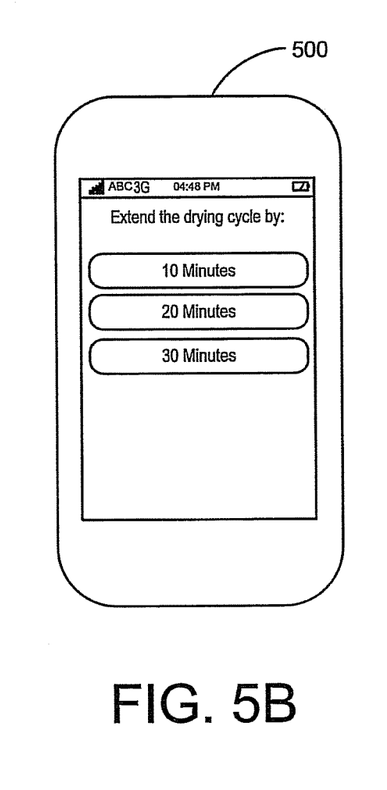
Figure 5C:
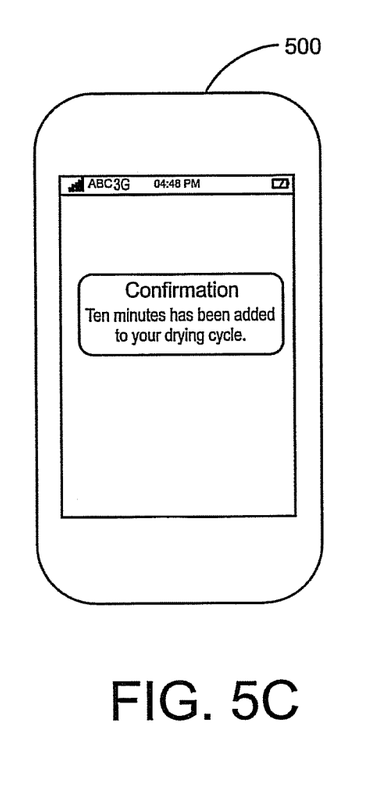

FIGS. 5A-5C together illustrate an example user interface 500 that may be provided on one example processing device 20, such as a mobile device. In this example, the interface 500 provides an alert to the consumer based upon information provide to the server 68 by the appliance 110. In particular, in this example, the appliance 110, and more particularly, the operation sensor 260 may determine that the laundry in a dryer appliance is still damp. The information is provided to the home hub 130 which in turn provide the data to the network 12. The server 68 then utilized the information stored in the data repository 68A to identify that an alert is suitable in this instance, and utilizes the network 12 to provide an alert to the user as shown in FIG. 5A. If the user decides to respond to the alert, the interface 500 may shown options to the user for extending and/or other modifying the operating cycle of the appliance 110. Once selected, the server 68 may provide a conformation message to the device 20 showing that the operation was a success as identified in FIG. 5C.

By utilizing the described system 100 the server 68 may provide the appliance 110 with all content of the owner's manual for the specific appliance, while providing immediate access to product specific information and visibility. The server 68 can also provide trouble-shooting and contact information so a consumer doesn't have to look through or find their Use and Care printed manuals but has the information at their finger tips on their handheld or mobile device.

The system 100 can provide up to date recall information, if applicable, or provide any new product information including new software or technology upgrades. Additionally, the server 68 can provide the customer with duress maintenance notification, such as, for example informing a customer when a part is wearing down or needs to be changed. This may allow the customer to be proactive with calling service early enough rather than having the machine break down and not be able to do their laundry or daily chores. In one example, the alert would persist on devices (e.g., appliance 110, home hub 120, device 20, etc) around the home until a consumer responds to it. The consumer has the ability to select which devices should receive the alerts, (TV, phone, computer, etc). This alert would be extremely convenient to allow them to maximize their time. The laundry appliance would detect problems and stop running itself before ruining something if it's a serious mechanical problem. Provides customer with scheduled maintenance alerts such as clean lint filter or check and/or clean exhaust vent notifications.

As previously noted, the system 100 allows the server 68 to provide real time alerts of machine status to a customer on their mobile device, TV, PC, etc. The system 100 may notify a customer of where the machine is during a specific cycle or if cycle is complete so they do not have to check its status and can multi task or continue with life's routines. This feature also may allow a customer to remote start or remote stop their laundry appliance enabling them to maximize their time.

Also as previously described, the system 100 may allow all of the cycle information to be preset and/or programmed on the appliance 110. After the customer selects a cycle and starts the machine on the actual appliance 110, the system 100 may provide the same cycle and the timer on the display to count down to the actual time of the cycle on the machine. In at least one example, the system 100 becomes fully automated, thus enabling the customer to avoid manually inputting anything. Additionally, the user interface 400 may allow a user to create their own custom profiles for themselves and other family members based on skill level, schedules or designated tasks. Thus, the appliances 110 may support customized settings and buttons based on the individual and not limited to just the task (Dad/Wash/Whites).

Similarly, because the system is coupled to the server 68, the system (e.g., the server 68) can keep track of a households wash cycles and weekly routines and thus remind the consumer what needs to be and when. Likewise, because the system 100 is integrated with mobile devices, PCs, tablets, home hubs, and the appliance 110 itself, the system 100 can track the consumer's pattern of use, and all of these devices can provide the user with feedback and instruction on how to be more efficient with routines after repeated use (maintenance, temperature, time of day, size of load, etc.). Thus, the system 100 can provide a savings tabulator that keeps track of daily, monthly yearly, and total history of savings to educate the consumer on ways to save energy and money. In one example the savings tabulator shows the benefits if one changed their normal routines and translate those savings into something concrete and tangible. This will allow the consumer to understand and work towards goals.

Still further, to ensure user friendliness, the system 100 enables the appliance 110 to recognize the brand, style, form, and formula of the detergent, so that the appliance 110 can deliver the perfect cleaning and care results. Through the use of the sensor unit 120, the appliance 110 can detect the formula in the machine based on, for example, the UPC barcode of the bottle so that it effectively works with an auto feeding mechanism (not shown) within the appliance 110 to accurately dispense an optimum detergent quantity depending on the load and the items being washed. The system 100 can cause the appliance 110 to adapt the wash cycle based on the detergent dispensed so that that clothes still come out optimally washed. In particular, in one common use example, if an improper detergent is used (for example, non-HE detergent in an HE machine), the appliance 110 will make the necessary adjustments to still provide great cleaning while adjusting rinse water to minimize the risk of sudsing, etc. In the same way, the appliance 110 can alert the consumer to a non HE detergent that is in the machine so it can accommodate the wash to the 'wrong' type of detergent so that clothes still come out optimally washed.

In regards to marketing, the system 100 can provide for brand messaging capabilities via the interactive interface, such as for example, a new detergent formula can be communicated to the consumer. Additionally, the system 100 can provide meaningful marketing advice based on historic usage such as, using standard HE detergent, the appliance 110 can tell the customer that using cold formula is available and could save you $xx for a comparative load.

By tracking the pattern of use and capturing usage data, the system 100 and the server 68 have the capability to suggest optimum wash timings and settings to minimize water, detergent, and electricity usage. Furthermore, a "fuel gauge" type dashboard interface displayed on the interface 400 can communicate with the user and in some instances trigger auto replenishment via syncing with e-commerce capability such as MyGofer e-commerce websites.

In still another example, the system 100 allows an appliance 110 to operate with multiple versions of a consumable. For example, where the appliance 110 is a laundry machine, the system 100 may allow for multi detergent usage, while still optimizing machine performance for each type of detergent. Thus, the customer has the capability to have multiple laundry detergents and fabric conditioner varieties in the separate dispenser chambers enabling personal fragrances for different users to be selected or chosen via pre-programmed settings. The appliance 110 can recognize the brand, style, form, and formula of the detergent and fabric conditioner so that it washes and dries optimally, or to settings chosen by the owner. It can detect the formula in the machine based on the UPC code of the bottle so that it effectively works with an auto feed in the machine to accurately dispense optimum detergent/conditioner quantity depending on the load and the items being washed, or setting chosen.

As previously noted, the appliance 110 can determine the type of consumable that is being utilized in the machine. In various embodiments, the customer can "search" for the name, UPC, brand of detergent that is auto populated within the machine memory. The customer can also keypad entry the UPC, with a algorithm already installed on the appliance 110 and/or available on the server 68. The information regarding the UPC codes can be USB updated and/or network 12 updated as desired. Furthermore, a bar-code scanner such as a smart phone using the camera/lens to photograph or scan the UPC barcode and wirelessly transmitting from the phone to the machine (e.g. Bluetooth, WiFi etc.) and/or hard-wire, via USB cable or the network 12.

With an identification of the laundry detergent (e.g. consumable) the system 100 such as the server 68 can cause the machine 110 to automatically operate a specific cycle based upon the identify consumable. In one example, the appliance determines that the consumable is a coldwater liquid laundry detergent. In this instance, the system 100 selects the "cold clean" or other appropriate cycle and then adjusts the wash and rinse temperatures to the optimal values based on the clothing load and the detergent used. In another example, if the detected consumable is a not a proper version for the machine cycle, the system 100 may add extra rinses at the end of the cycle to prevent any 'over-sudsing'.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A system for networking an appliance comprising:
   an appliance on a network, the appliance being configured to perform a cycle of operation, the appliance comprising:
      a microcontroller;
      a memory coupled with the microcontroller and having stored thereon computer executable instructions for operating the appliance;
      at least one sensor coupled to the microcontroller to monitor the usage of the appliance and a level of a consumable product used by the appliance during the operation cycle;
      a user interface coupled to the microcontroller and having provided thereon user interface elements to provide information regarding the usage of the appliance; and
      a communicator coupled to the microcontroller, the communicator adapted to provide network connectivity, wherein the appliance is adapted to communicate with a host system via the network, wherein the appliance is adapted to communicate with another appliance on the network, wherein the communicator is configured to transmit at least one sensor data indicative of usage of the appliance and the level of the consumable product used by the appliance during the operation cycle to one or more of the network and the another appliance; and
   the host system connected to the network and adapted to receive, via the network, the at least one sensor data indicative of usage of the appliance and the level of the consumable product used by the appliance during the operation cycle and to transmit, via the network, computer readable instructions from a device coupled to the host system and adapted to display, via the network, data indicative of usage of the appliance to a user on the user interface, wherein the host system tracks a pattern of the usage of the appliance and the level of the consumable product used by the appliance during the operation cycle, and wherein the host system provides a recommendation based on the pattern of the usage of the appliance and the level of the consumable product used by the appliance during the operation cycle to improve the operation cycle of the appliance.

2. The system of claim 1, wherein the appliance is a laundry device.

3. The system of claim 1, wherein the host system comprises an application server to provide at least one application to the appliance.

4. The system of claim 1, wherein the host system comprises an upgrade server to provide at least one set of computer executable instructions to modify the computer executable instructions stored in the memory.

5. The system of claim 1, wherein the host system includes a service server to provide data to the appliance to maintain or repair the appliance.

6. The system of claim 1, wherein the communicator is a home hub configured to communicate with a plurality of appliances.

7. The system of claim 1, wherein the memory stores a manual of operating instructions, and wherein the manual of operating instructions is displayable on the user interface.

8. The system of claim 1, wherein the host system is adapted to provide the user interface with service or operating alerts.

9. The system of claim 1, wherein the memory is configured to store customized operating instructions.

10. The system of claim 9, wherein the user interface is adapted to modify the customized operating instructions.

11. The system of claim 1, wherein the host system is configured to analyze the data indicative of usage of the appliance and calculate an expected savings based upon a comparison of the data indicative of usage of the appliance and a predetermined data set of typical usage scenarios.

12. The system of claim 1, wherein the host system is configured to analyze the data indicative of usage of the appliance and provide recommendations regarding usage optimization by comparison of the data indicative of usage of the appliance and a predetermined data set of optimized usage scenarios.

13. The system of claim 1, further comprising a consumable identification device to enable the appliance to identify the composition of a consumable necessary for operation of the appliance.

14. The system of claim 13, wherein the consumable identification device is a scanner.

15. The system of claim 14, wherein the scanner is a bar-code scanner.

16. The system of claim 13, wherein the consumable identification device is a chemical sensor configured to detect the chemical composition of the consumable.

17. The system of claim 13, wherein at least one of the host system or the appliance is configured to receive an identification of the consumable from the consumable identification device and to transmit computer readable instructions to the appliance that when executed by the microcontroller cause the microcontroller to modify the operation of the appliance based upon the identification of the consumable.

18. A method of networking a plurality of appliances comprising:
providing an appliance on a network, wherein the appliance is configured to perform a cycle of operation, wherein the appliance includes a microcontroller, a memory, at least one sensor, a user interface and a communicator;
controlling operation of the appliance with the microcontroller;
storing on the memory coupled with the microcontroller, computer executable instructions for operating the appliance;
sensing the operation of the appliance and a level of a consumable product used by the appliance during the operation cycle with at least one sensor, wherein at least one sensor data indicative of the operation of the appliance is stored in the memory;
displaying on the user interface coupled to the microcontroller, a user interface element to provide information regarding the operation of the appliance;
communicating through the communicator coupled to the microcontroller, the communicator being adapted to provide network connectivity, wherein the appliance is adapted to communicate with the network, wherein the appliance is adapted to communicate with another appliance on the network, wherein the communicator is configured to transmit at least one sensor data indicative of operation of the appliance and the level of the consumable product used by the appliance during the operation cycle to one or more of the network and the another appliance;
providing a host system connected to the network and adapted to receive, via the network, the at least one sensor data indicative of usage of the appliance and the level of the consumable product used by the appliance during the operation cycle and to transmit, via the network, computer readable instructions from a device coupled to the host system and adapted to display, via the network, data indicative of usage of the appliance to a user on the user interface;
tracking a pattern of the usage of the appliance and the level of the consumable product used by the appliance during the operation cycle; and
providing a recommendation based on the pattern of the usage of the appliance and the level of the consumable product used by the appliance during the operation cycle to improve the operation cycle of the appliance.

19. The method of claim 18, further comprising providing an application server to provide at least one application to the appliance.

20. The method of claim 18, further comprising providing an upgrade server to provide at least one set of computer executable instructions to modify the computer executable instructions stored in the memory.

21. The method of claim 18, further comprising providing data to the appliance to maintain or repair the appliance.

22. The method of claim 18, further comprising storing a manual of operating instructions, and wherein the manual of operating instructions is displayable on the user interface.

23. The method of claim 18, further comprising providing the user interface with service or operating alerts.

24. The method of claim 18, further comprising storing customized operating instructions on the appliance.

25. The method of claim 24, wherein the user interface is adapted for modifying the customized operating instructions.

26. The method of claim 18, further comprising analyzing the data indicative of usage of the appliance and calculating an expected savings based upon a comparison of the data indicative of usage of the appliance and a predetermined data set of typical usage scenarios.

27. The method of claim 18, further comprising analyzing the data indicative of usage of the appliance and providing recommendations regarding usage optimization by comparison of the data indicative of usage of the appliance and a predetermined data set of optimized usage scenarios.

28. The method of claim 18, further comprising identifying the composition of a consumable necessary for operation of the appliance.

29. The method of claim 28, wherein identifying the composition of the consumable is performed by a scanner.

30. The method of claim 28, wherein identifying the composition of the consumable is performed by a chemical sensor configured to detect the chemical composition of the consumable.

31. The method of claim 28, further comprising receiving an identification of the consumable and transmitting computer readable instructions to the appliance that when executed by the microcontroller cause the microcontroller to modify the operation of the appliance based upon the identification of the consumable.

32. The system of claim 1, wherein the communicator of the appliance is configured to communicate with a plurality of appliances on the network, wherein the communicator of the appliance is configured to provide access to the host system for the plurality of appliances.

33. The method of claim 18, comprising:
configuring the communicator of the appliance to communicate with a plurality of appliances on the network; and
configuring the communicator of the appliance to provide access to the host system for the plurality of appliances.

34. The system of claim 1,
wherein the host system processes the at least one sensor data indicative of the usage of the appliance and, based on the processing of the at least one sensor data, the host system sends a notification of incorrect usage and one or more recommendations for correct usage to the user interface, and wherein the user interface is adapted to accept a user inputted command to cause the device to transmit, via the network, computer readable instructions to the appliance that when executed by the microcontroller cause the microcontroller to modify the operation cycle of the appliance on the article.

35. The method of claim 18, wherein the user interface is adapted to accept a user inputted command to cause the device to transmit, via the network, computer readable instructions to the appliance that when executed by the microcontroller cause the microcontroller to modify the operation cycle of the appliance on the article.

36. The system of claim 1, wherein the system is configured to support customized settings based on a particular user that affect the operation cycle of the appliance.

* * * * *